United States Patent

Haga et al.

[11] Patent Number: 5,897,281
[45] Date of Patent: Apr. 27, 1999

[54] PUSH NUT AND METHOD FOR PRODUCING THE SAME

[75] Inventors: Yoshiaki Haga; Ken'ichi Miyoshi; Fumio Nakazima; Yoshinobu Katsuno, all of Nagano-ken, Japan

[73] Assignees: Topy Fasteners, Ltd., Matsumoto; Ichikoh Industries, Ltd., Tokyo, both of Japan

[21] Appl. No.: 08/874,482

[22] Filed: Jun. 13, 1997

[30] Foreign Application Priority Data

Jul. 22, 1996 [JP] Japan ................................. 8-210521

[51] Int. Cl.⁶ ........................................... F16B 21/18
[52] U.S. Cl. ............................................. 411/525; 411/521
[58] Field of Search ........................... 411/525–527, 502, 411/521, 174, 175

[56] References Cited

U.S. PATENT DOCUMENTS

| | | | |
|---|---|---|---|
| Re. 22,659 | 8/1945 | Tinnerman | 411/525 |
| 3,796,124 | 3/1974 | Crosa | 411/521 |
| 4,201,111 | 5/1980 | Kuttler | 411/527 |
| 4,647,263 | 3/1987 | Macfee | 411/174 |
| 4,676,530 | 6/1987 | Nordgren | 411/521 |
| 4,826,375 | 5/1989 | Holton | 411/174 |
| 5,707,192 | 1/1998 | Vortriede | 411/526 |

*Primary Examiner*—Flemming Saether
*Attorney, Agent, or Firm*—Wenderoth, Lind & Ponack, L.L.P.

[57] ABSTRACT

A push nut having a washer member and a push spring with radial blade pieces arranged like a truncated cone serves to firmly retain a shaft or rod onto a frame or chassis of an electrical appliance or the like. The push nut, comprising the washer member and the push spring connected by one or more connectors, can easily be formed in one body by cutting or punching out an elastic plate into an elementary flat plate and folding the elementary flat plate so as to place the push spring and washer member one on another. The push nut having the united push spring and washer member is easy to handle and produce.

5 Claims, 5 Drawing Sheets

PUSH NUT AND METHOD FOR PRODUCING THE SAME

BACKGROUND OF THE INVENTION

1. Field of the Invention

This invention relates to an improvement in a push nut for securing a shaft, rod and so forth onto a frame or chassis of household electrical appliances, precision machinery and the like, and a method for producing the improved push nut.

2. Description of the Prior Art

A conventional push nut is generally composed of a round spring rim having a central hole, and flat blade pieces extending centripetally from the spring rim. The push nut is readily engaged with a shaft merely by forcibly inserting the shaft forcibly into the central hole of the push nut. When thrusting the shaft into the central hole of the push nut, the flat blade pieces are resiliently bent and grown into the shaft.

However, in a case of applying the push nut of this type to a rotary element such as a rotating shaft, between the push nut and the thrust face of the rotary element, there is usually interposed a washer to avoid frictional contact occurring therebetween. The work required for inserting the shaft into the washer before thrusting the shaft into the push nut consumes much time and labor and increases the possibility of experiencing mechanical trouble. Besides, the machinery employing the conventional push nut becomes inevitably more complicated and the number of component parts is increased. Furthermore, the conventional push nut suffers a disadvantage such that it must be taken off from the shaft when failing to insert the washer.

OBJECT OF THE INVENTION

An object of the present invention is to provide a push nut which is capable of being easily handled without using a washer or any other parts and can be produced at a low cost.

Another object of the invention is to provide a simple push nut which is integrated with a washer member, and into which a shaft or the like can readily be inserted by a single operation.

Still another object of the invention is to provide a method capable of easily producing an excellent push nut which is integrated with a washer member by a simple manufacturing process.

SUMMARY OF THE INVENTION

To attain the objects described above according to the present invention, there is provided a push nut comprising a push spring, a washer member, and one or more connectors for connecting the push spring to the washer member.

The push spring is formed in an annular shape having a central push hole and provided with radial blade pieces extending centripetally and slanted upwardly. The washer member is formed in an annular shape having a central hole which is arranged coaxially with the central push hole of the push spring, by bending the connector into a substantially U-shape so as to place the push spring and washer member one on top of the other.

The washer member may be provided on its circumferential outer edge with one or more retaining tongues rising toward the push spring.

The washer member may be made flat or wavy.

The washer member may be divided into washer segments shaped in an arc conforming to the curvature of the push spring. The arc-shaped washer segments constituting the washer member are connected to the push spring through the connectors at which the washer segments are folded.

The arc-shaped washer segment may be made flat or wavy.

Other and further objects of this invention will become obvious upon an understanding of the illustrative embodiments about to be described or will be indicated in the appended claims, and various advantages not referred to herein will be apparent to one skilled in the art upon employment of the invention in practice.

DESCRIPTION OF THE PREFERRED EMBODIMENTS

Figure 1:
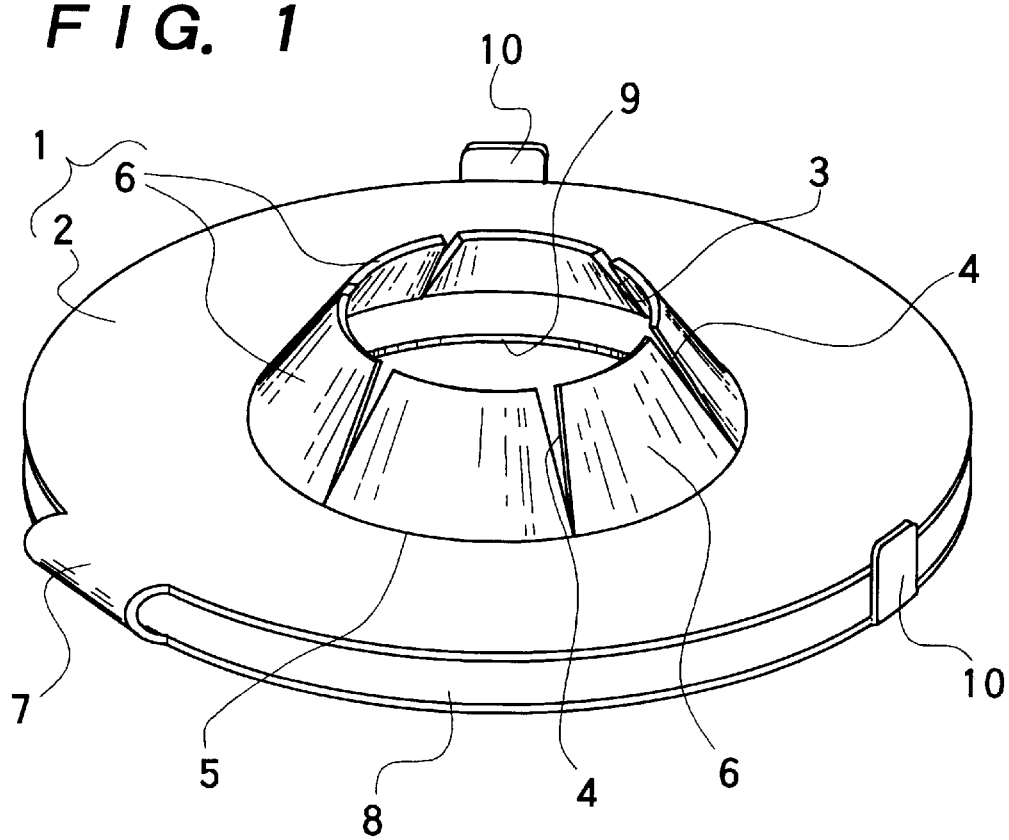
FIG. 1 is a perspective view showing the first embodiment of a push nut according to this invention.

The first embodiment of a push nut according to the present invention will be described hereinafter with reference to FIGS. 1 and 2.

The push nut of the invention comprises a push spring 1 formed in an annular shape, a washer member 8 formed in an annular shape similar to that of the push spring 1, and a connector 7 for connecting the push spring 1 to the washer member 8.

The push spring 1 comprises an annular flat rim 2 having a regular circumferential width so as to form a central push hole 3, and radial blade pieces 6 extending centripetally from the circumferential inner edge of the rim 2. The blade pieces 6 are separated circumferentially by notches 4 and slanted upwardly from a boundary 5 like a bevel of a truncated cone.

The washer member 8 is formed in an annular shape having a central hole 9. The central hole 9 is formed coaxially with the push hole 3 of the push spring 1.

The washer member 8 is provided on its circumferential outer edge with one or more retaining tongues 10 which rise at right angles to the washer member 8 and are directed toward the push spring 1.

Figure 2:
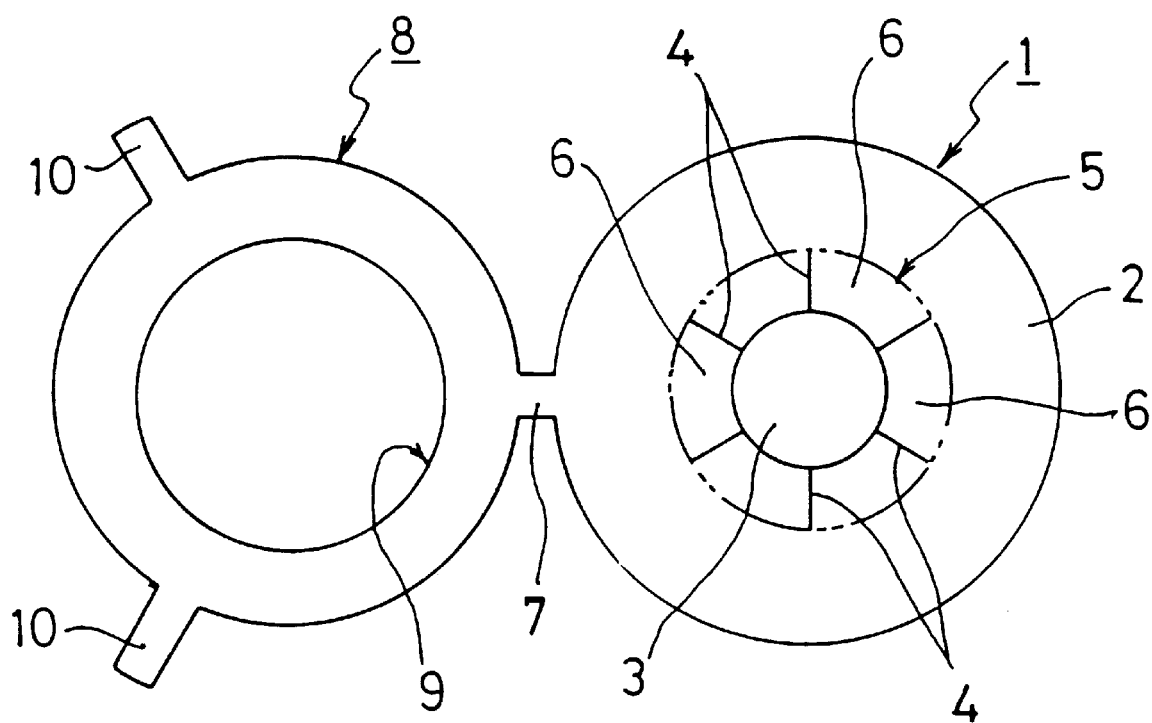
FIG. 2 is a plan view showing an elementary plate cut out from an elastic plate for producing the push nut of FIG. 1.

The push spring 1 and the washer member 8 with the retaining tongues 10, which are integrated with each other through the connector 7 in one body can be initially made flat by being cut or punched out from an elastic plate of metal, steel or other materials to obtain an elementary flat plate as shown in FIG. 2. Thus, the push nut of the invention is finished only by bending the connector 7 into a substantially U-shape on the whole so as to place the push spring 1 and washer member 8 one on top of the other, and bending the blade pieces 6 aslant into a substantially truncated conical shape and the retaining tongues 10 at right angles to the washer member 8. The processes of punching and bending can readily be accomplished continuously or in one operation by using a press machine or the like.

To be more specific, the aforesaid elementary flat plate as shown in FIG. 2, which includes the push spring 1, the washer member 8 and the connector 7, is first punched out from the plate of metal or other materials having sufficient elasticity. Simultaneously, there are formed the push hole 3 in the push spring 1, radial cuts for notches 4 in the part encircled by the boundary 5 of the push spring 1 around the push hole 3, and the central hole 9 in the washer member 8. The push hole 3 defined substantially by the tip ends of the blade pieces 6 is made smaller than the diameter of a shaft or rod which is used in conjunction with the push nut of this invention. The central hole 9 in the washer member 8 is made larger than the diameter of the shaft or rod.

Next, the elementary flat plate is pressed so as to raise the blade pieces 6 into a general shape like a truncated cone. And then, the elementary flat plate is bent back at the connector 7 into a substantially U-shape on the whole so as to place the push spring 1 and the washer member 8 one on top of the other with the push hole 3 coaxially coincided with the central hole 9. That is to say, the washer member 8 is folded at the connector 7 in the direction opposite to that in which the blade pieces 6 are projected, as illustrated in FIG. 1.

Figure 3:
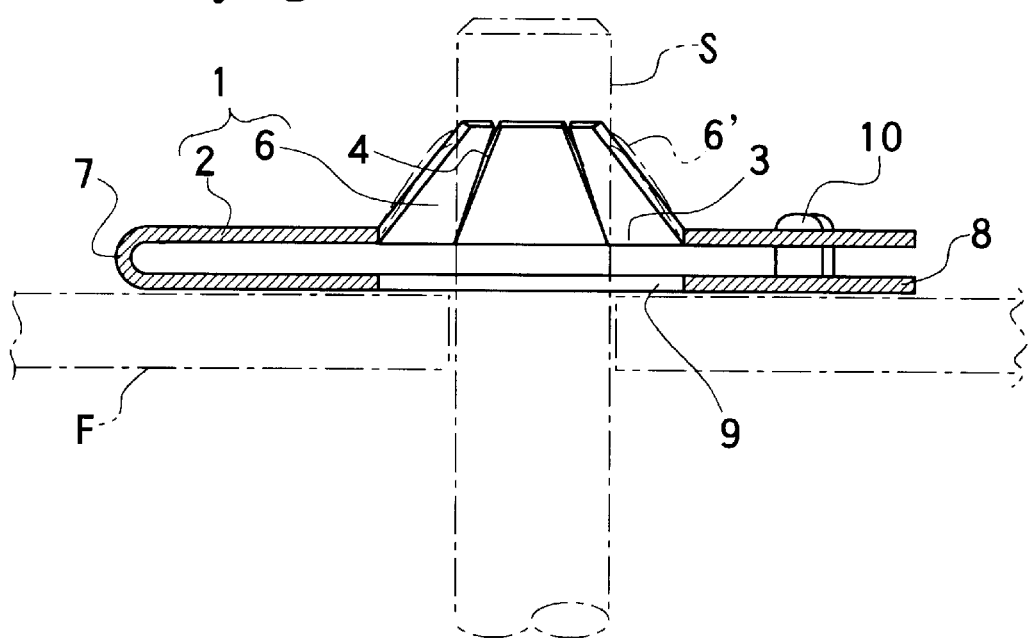
FIG. 3 is a side sectioned view showing the push nut of FIG. 1.

When using the push nut described above, as shown in FIG. 3, a shaft or rod S to be fixed on an object article F such as a frame and chassis of an appliance or other implements is inserted, from the side of the push spring 1, into the coaxial holes 3 and 9 of the push spring 1 and washer member 8 which lie one upon another. The shaft S is thrust into the holes 3 and 9 while elastically bending the blade pieces 6 in its ingrowing state as indicated by 6' in FIG. 3. As a result, the shaft S is firmly retained in position relative to the frame F. In some cases, the push nut may be attached onto one end or both ends of the shaft or rod S retained by the stationary frame or chassis F of a household electrical appliance or other implements.

Figure 4:
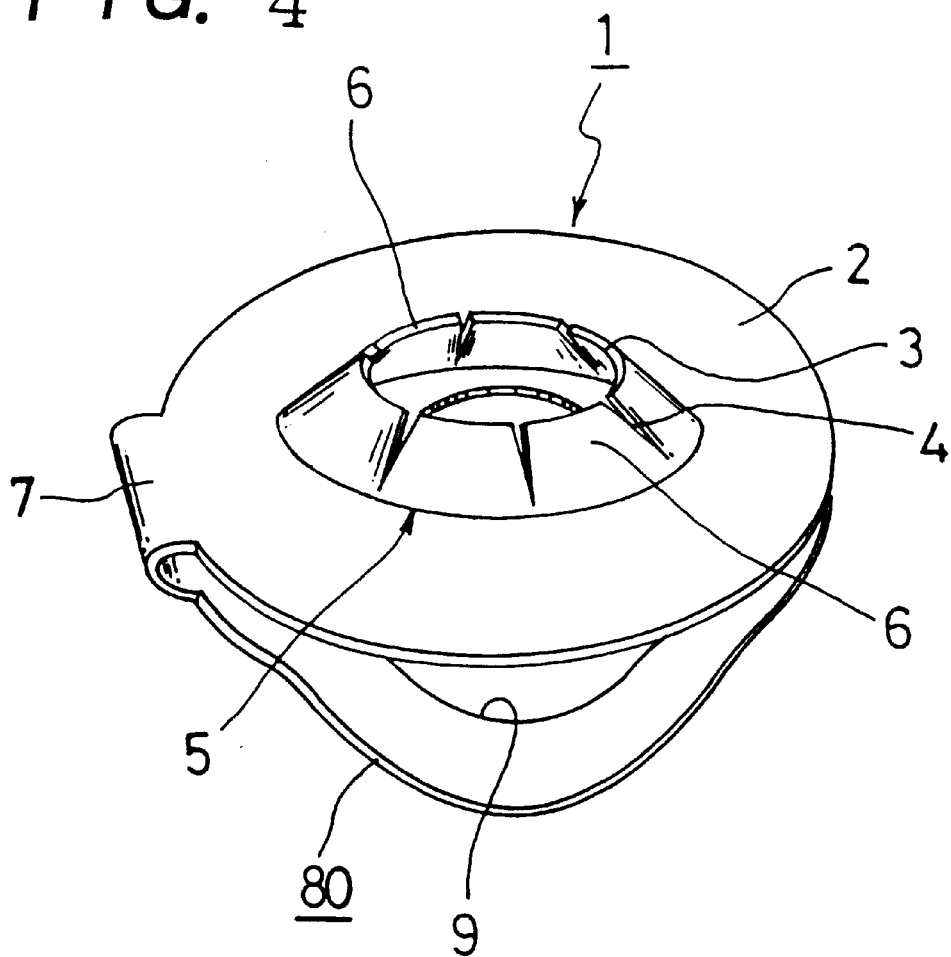
FIG. 4 is a perspective view showing the second embodiment of the invention.
Figure 5:
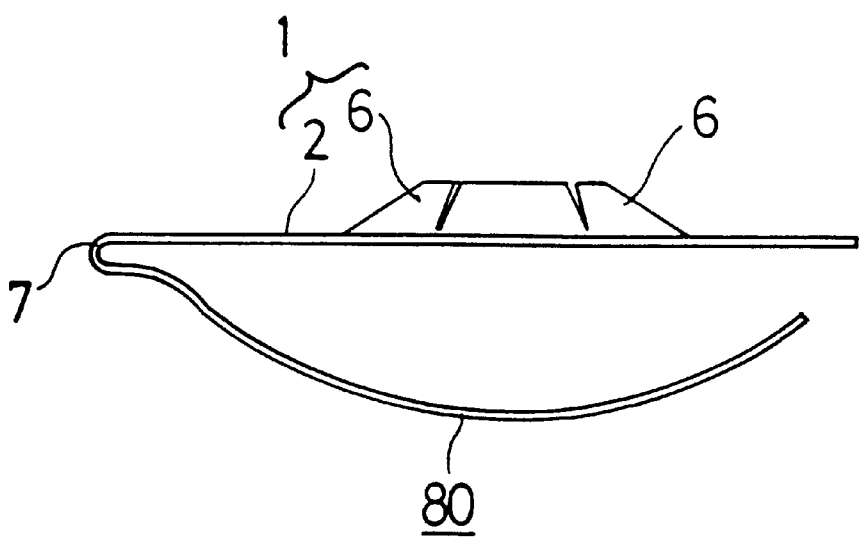
FIG. 5 is a side view showing the push nut of FIG. 4.

Although the washer member 8 in the foregoing first embodiment is made flat, it may be convenient to be made wavy as shown in FIGS. 4 and 5 which illustrate the second embodiment of the invention. The component elements identified by the same reference numerals as those in the first embodiment of FIGS. 1 to 3 have the same structure and function as their counterparts in the first embodiment and will not be described further here.

The washer member 80 in this embodiment is made of an elastic plate and waved so as to heighten its elasticity.

The push nut comprising the push spring 1 and the waved washer member 80 can be used in the same manner as that of the first embodiment described above. That is, fixation of the shaft or rod to an object article such as a frame or panel and vice versa can be accomplished merely by forcing the push nut of the invention onto the shaft or rod. The push nut of this embodiment can retain the shaft or rod to the object article more strongly compared with that of the first embodiment.

Figure 6:
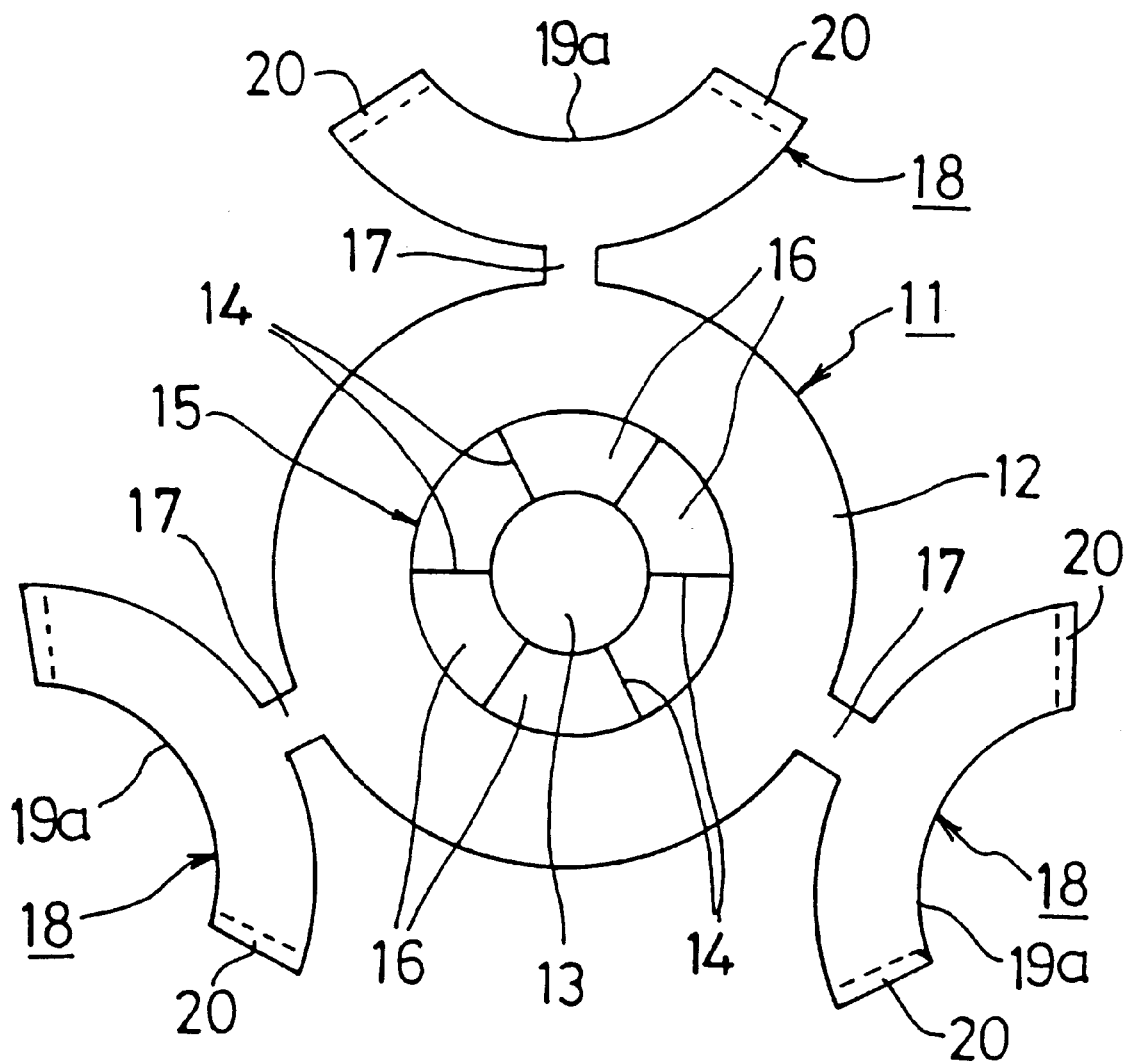
FIG. 6 is a plan view showing an elementary plate cut out from an elastic plate for producing the push nut in the third embodiment of the invention.
Figure 7:
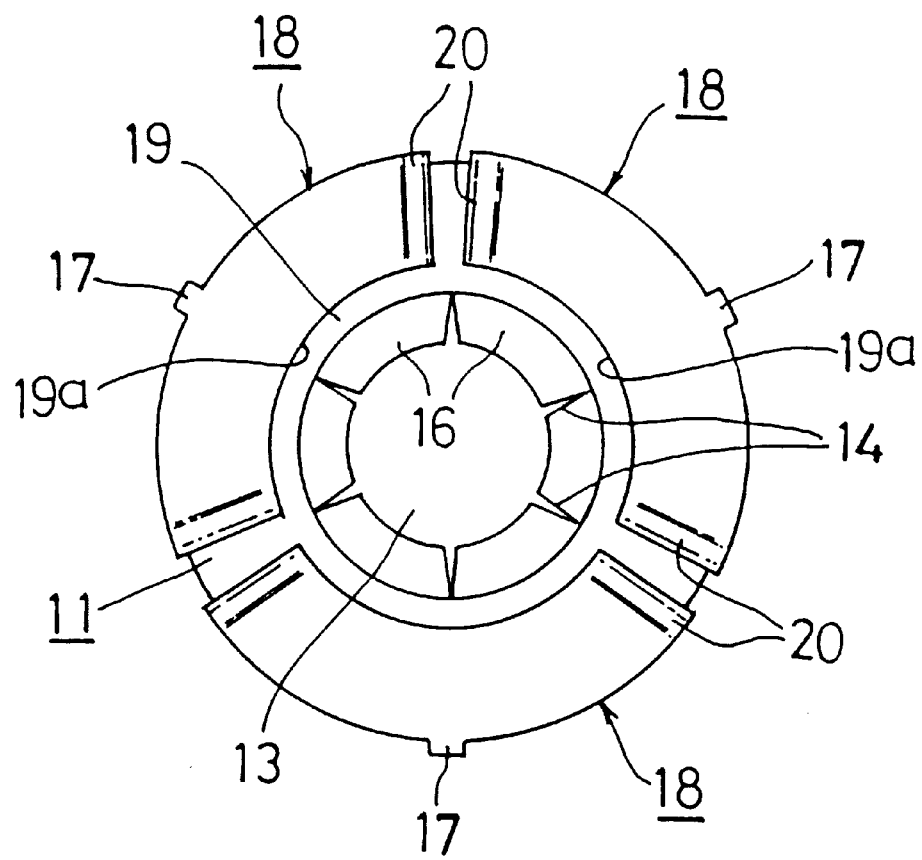
FIG. 7 is a bottom view showing the push nut formed of the elastic plate of FIG. 6.
Figure 8:
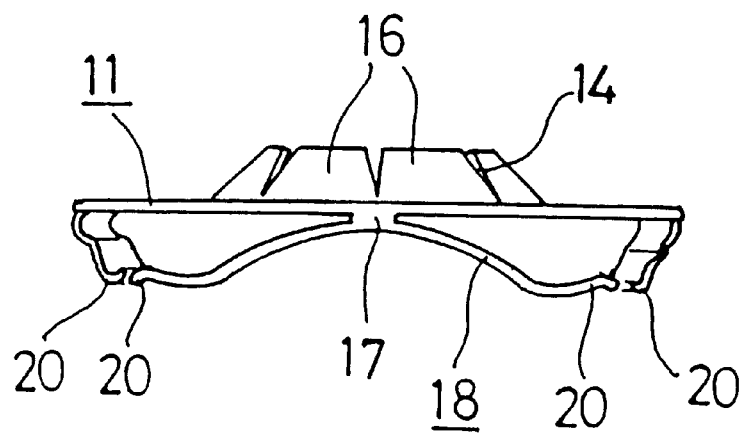
FIG. 8 is a side view showing the push nut of FIG. 6.

FIGS. 6 through 8 show the third embodiment of this invention. The push nut of this embodiment comprises a push spring 11 fundamentally analogous to that of the first and second embodiments, a washer member 18 divided into three washer segments, and connectors 17 for connecting the respective washer segments of the washer member 18 to the push spring 11.

Similarly to the first and second embodiments, the push spring 11 has an annular flat rim 12 having a central push hole 13 and radial blade pieces 16 extending centripetally from the circumferential inner edge of the rim 12 and slanted upwardly. The blade pieces 16 are separated circumferentially by notches 14 and slanted upwardly from a boundary 15 to assume a substantially truncated cone.

Each of the washer segments constituting the washer member 18 assumes an arc shape in conformity with the curvature of the the annular push spring 12, so that the arc-shaped inner edges 19a of the washer segments 18 as a whole define a central hole 19 when folding the washer segments on the push spring 11 at the connectors 17. Namely, the washer segments are circumferentially aligned conforming to the shape of the push spring 12. Each washer segment of the washer member 18 is made wavy as shown in FIG. 8, and has circumferential ends 20 curved in the direction receding from the push spring 11.

The push nut of this embodiment can be used in the same manner as that of the foregoing embodiments. That is to say, by thrusting one end of a shaft or rod from the side of the push spring 11 into the coaxially coincided holes 13 and 19 of the push spring 11 and washer member 18 folded one upon another, the push nut is firmly clamped by the blade pieces 16 to securely retain the union of the shaft and an object article such as a frame o an appliance.

The push nut of this third embodiment can be produced by the same method as that in the foregoing first and second embodiments. Namely, by using a press machine, an elementary flat plate is formed by punching out an elastic plate of metal or other materials having sufficient elasticity into the shape shown in FIG. 6. At this time, the push hole 13 and notches 14 are formed in the push spring 11.

Next, the elementary flat plate is pressed so as to raise the blade pieces 16 into a general shape like a truncated cone. And then, the washer segments 18 are bent back at the connectors 17 so as to be placed just beneath the push spring 11 and form the central hole 19 coaxial with the push hole 13 of the push spring 11.

Although the washer member 18 in this embodiment is divided into three segments, it is needless to say that the number into which the washer member 18 is divided is not specifically limited, and may be two or four or more. In the case that the washer member 18 is divided into two washer segments, two substantially semicircular segments are placed symmetrically astride the push spring 11 and connected to the push spring 11 through two connectors 17.

As is apparent from the foregoing description, the push nut of the invention can readily be produced by remarkably simple processes of cutting or punching out an elastic plate of metal or other materials into an elementary flat plate having the push spring, washer member and at least one connector by use of a press machine, and folding the push spring and washer member at the connector into a substantially U-shape on the whole so as to place the push spring and washer member one on another. Thus, this push nut is easy to handle and produce, and serves an excellent function of securely retaining various rod-shaped articles with a very simple operation Furthermore, since the push nut of the invention is formed of the united push spring and washer member, fitting of the push nut to the rod-shaped article can readily be effected without failing to insert a washer used for a conventional nut or entailing any disadvantage such that a plurality of washers are inserted in, for instance, assembling electric parts into an electric appliance. Thus, this push nut can be produced at a low cost and effectively used.

Owing to one or more retaining tongues 10 formed on the washer member 8, when a large number of the push nuts are put in a parts feeder or other reservoirs for various automatic machine tools as one example, they can be stably and reliably fed to the automatic machine tool without being tangled nor interfering with one another.

It is to be understood that the invention is not limited in its application to the details of construction and arrangement of parts illustrated in the accompanying drawings, since the invention is capable of other embodiments and of being practiced or carried out in various ways. Also it is to be understood that the phraselogy or terminology employed herein is for the purpose of description and not of limitation.

What is claimed is:

1. A push nut comprising:
   a push spring including an annular rim and a plurality of radial blade pieces extending aslant centripetally from an inner periphery of said annular rim such that said radial blade pieces define a central push hole;
   a washer member having a central hole arranged coaxially with said central push hole of said push spring;
   a connector for securing said push spring to said washer member; and
   a plurality of retaining tongues extending from an outer circumferential edge of said washer member toward said push spring, wherein said tabs are positioned so as to maintain coaxial alignment of said central push hole with said central hole of said washer member.

2. The push nut as claimed in claim 1, wherein said washer member is substantially flat.

3. The push nut as claimed in claim 1, wherein said push spring, said washer member, and said connector define an integral one-piece unit.

4. A push nut for being pushed on a rod or shaft, said push nut comprising:
   an annular plate defining a through hole having a central axis;
   a plurality of blade pieces, said blade pieces being connected to a peripheral edge of said through hole of said annular plate, wherein said blade pieces extend at an angle outwardly from said annular plate in a direction toward said central axis of said through hole so as to define a push hole; and
   an annular washer member connected to said annular plate and having a through hole, wherein said washer member is disposed relative to said annular plate so that said washer member through hole is coaxial with said annular plate through hole;
   a connector for connecting said annular plate to said washer member; and
   a plurality of retaining tongues extending perpendicularly from an outer peripheral ed portion of said washer member an in a direction toward said annular plate, wherein said retaining tongues are positioned so as to maintain said through hole of said annular plate and said through hole of said annular washer member in substantially coaxial alignment.

5. The push nut as claimed in claim 4, wherein said annular plate and said washer member are connected together at only a single location.

* * * * *